US009282135B2

(12) United States Patent
L'Heureux et al.

(10) Patent No.: US 9,282,135 B2
(45) Date of Patent: Mar. 8, 2016

(54) ENHANCED COMPUTER NETWORKING VIA MULTI-CONNECTION OBJECT RETRIEVAL

(76) Inventors: Israel L'Heureux, Monaco (MC); Mark D. Alleman, Portland, OR (US)

( * ) Notice: Subject to any disclaimer, the term of this patent is extended or adjusted under 35 U.S.C. 154(b) by 215 days.

(21) Appl. No.: 12/915,539

(22) Filed: Oct. 29, 2010

(65) Prior Publication Data

US 2014/0258365 A1    Sep. 11, 2014

(51) Int. Cl.
*H04L 29/06* (2006.01)
*H04L 29/08* (2006.01)
*G06F 9/46* (2006.01)

(52) U.S. Cl.
CPC ............... *H04L 67/02* (2013.01); *G06F 9/465* (2013.01); *H04L 63/1408* (2013.01); *H04L 67/101* (2013.01); *H04L 67/14* (2013.01); *H04L 67/1023* (2013.01); *H04L 67/16* (2013.01); *H04L 69/16* (2013.01)

(58) Field of Classification Search
CPC ... H04L 65/602; H04L 65/604; H04L 65/607; H04L 67/06; H04N 21/25808; H04N 21/8456; H04N 21/2662

USPC .................. 709/203, 223, 224, 230, 231, 245
See application file for complete search history.

(56) References Cited

U.S. PATENT DOCUMENTS

| | | | |
|---|---|---|---|
| 2003/0200175 A1* | 10/2003 | Wang et al. ...................... 705/50 |
| 2006/0029037 A1* | 2/2006 | Chen et al. ..................... 370/351 |
| 2007/0043874 A1* | 2/2007 | Nath et al. ...................... 709/230 |
| 2011/0096828 A1* | 4/2011 | Chen et al. ............... 375/240.02 |
| 2011/0239078 A1* | 9/2011 | Luby et al. ..................... 714/752 |
| 2012/0078994 A1* | 3/2012 | Jackowski et al. ............ 709/202 |

* cited by examiner

*Primary Examiner* — Barbara Burgess
(74) *Attorney, Agent, or Firm* — Michael J. Andri (57) ABSTRACT

Method and device implementations for network communications are disclosed. In at least one implementation, a computer networking method is disclosed which comprises opening a plurality of parallel TCP connections at a client computing device between a client program executed on the client computing device and a server program executed on a server computing device over a computer network. The method further comprises sending each of a plurality of application level web resource requests for respective byte ranges of an object from the client program executed on the client computing device to the server program executed on the server computing device over a corresponding one of the plurality of parallel TCP connections.

15 Claims, 5 Drawing Sheets

ENHANCED COMPUTER NETWORKING VIA MULTI-CONNECTION OBJECT RETRIEVAL

BACKGROUND

Computing networks utilize a variety of protocols to facilitate communication between two or more network nodes. The Transmission Control Protocol (TCP) is an example of a protocol that forms part of the Internet Protocol Suite. TCP is commonly regarded as a transport level protocol that provides the service of exchanging data reliably and directly between two network nodes. TCP is currently the protocol that many network applications rely on, such as the World Wide Web, e-mail, and file transfer. The Hypertext Transfer Protocol (HTTP) is another protocol that may be utilized in conjunction with TCP to facilitate communication between two or more network nodes. HTTP is commonly regarded as an application level protocol that is often implemented in the context of distributed hypermedia information systems. HTTP is currently the foundation of data communication for the World Wide Web. Communication over real world networks using these protocols can be frustrated, however, by packet loss in intermediate network devices, which slows down communications.

SUMMARY

Implementations for network communications are disclosed. In at least one implementation, a computer networking method is disclosed which comprises opening a plurality of parallel TCP connections at a client computing device between a client program executed on the client computing device and a server program executed on a server computing device over a computer network. The method further comprises sending each of a plurality of application level web resource requests for respective byte ranges of an object from the client program executed on the client computing device to the server program executed on the server computing device over a corresponding one of the plurality of parallel TCP connections. Claimed subject matter, however, is not limited by this summary as other implementations are disclosed by the following written description and associated drawings.

DETAILED DESCRIPTION

Method and device implementations for network communications are disclosed in the context of the Transmission Control Protocol (TCP) for computer networking. As described in greater detail herein, a plurality of parallel TCP connections may be opened at a client computing device between the client computing device and a server computing device. A web resource or object may be obtained from the server computing device by the client computing device as separate byte ranges of the object transmitted over respective parallel TCP connections. Individual byte ranges of the object may be assembled at the client computing device to be utilized by the client computing device in any number of ways.

The disclosed implementations address the issue of network latency resulting from reliance on a single TCP connection as the sole path for obtaining an object over a communication network. The ability for a client computing device to obtain an object over a plurality of parallel TCP connections may increase the rate and reliability by which the object may be transmitted between network nodes. For example, for a given connection speed, a plurality of parallel TCP connections can transfer a given amount of information at a higher combined rate than an individual TCP connection. As another example, packet loss occurring in a communication network may cause a reduction in the rate at which information is transferred over a given TCP connection by 50% or more. An individual TCP connection may be relatively slow at recovering from such packet loss. However, obtaining an object over a plurality of parallel TCP connections may reduce the effects of packet loss on the overall transfer rate of the object, particularly if the packet loss was transient and was not overcome by fast retransmit algorithms.

As will be described in greater detail, the decision of how many parallel TCP connections to open for a given object may be determined by a client computing device based on a number of factors, including the connection state and object size. A server computing device may assist a client computing device determine how many parallel TCP connections to open for a given object. The server computing device may also assist the client computing device determine or select respective byte ranges of an object to be requested over parallel TCP connections.

Figure 1:
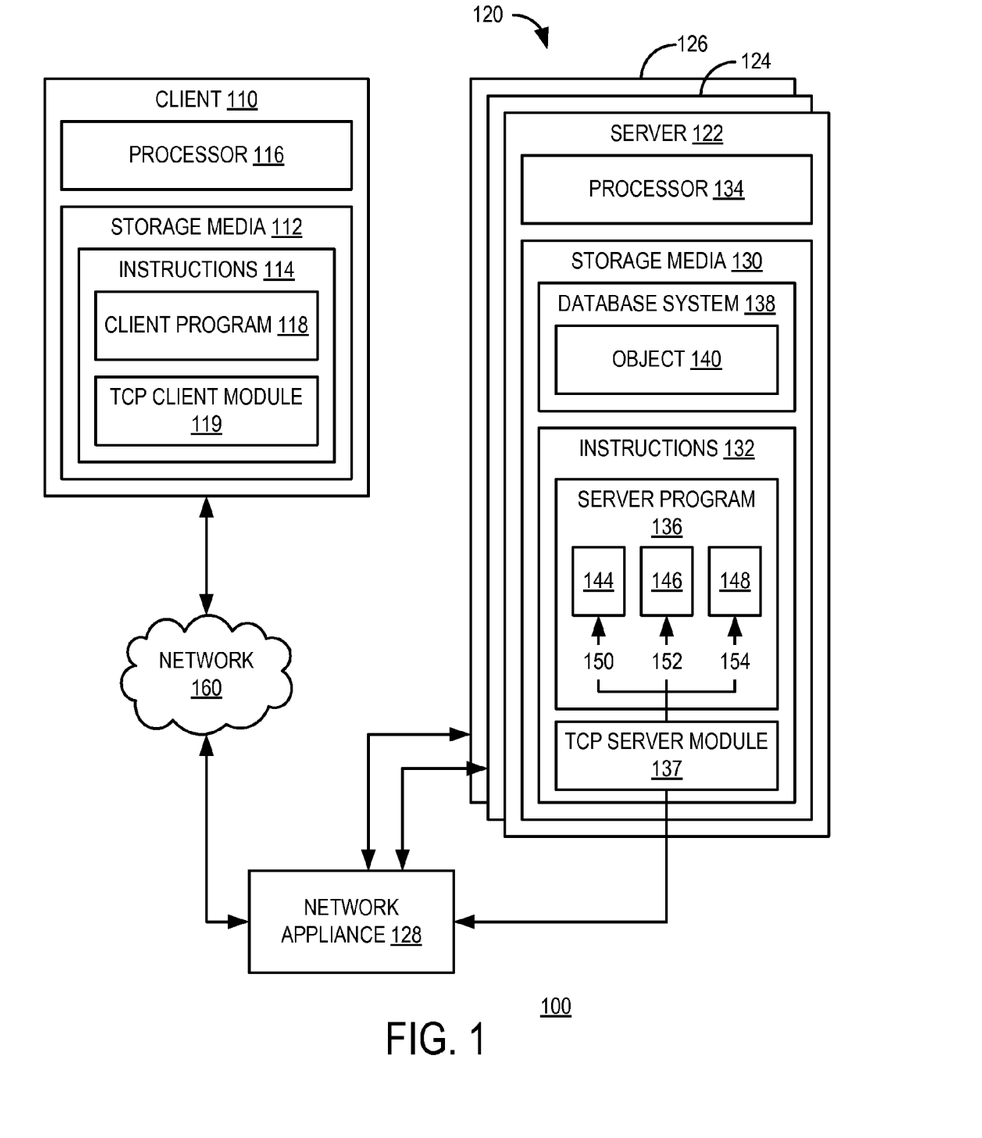
FIG. 1 is a schematic diagram depicting an example computing environment according to at least one implementation.

FIG. 1 is a schematic diagram depicting an example computing environment 100 according to at least one implementation. Computing environment 100 includes a client computing device 110 and a server system 120 that may communicate with each other via a communication network 160. Communication network 160 may comprise one or more of a wide area network (WAN) (e.g., the Internet), a local area network (LAN) (e.g., an intranet), or a personal area network (PAN).

Client computing device 110 may refer to any suitable computing device, such as, for example, a mobile handheld computing device, a desktop computing device, a laptop or notebook computing device, or a computing device integrated into an electronic appliance. Computing device 110 may comprise storage media 112 having or including instructions 114 stored thereon.

Instructions 114 may be executable by one or more processors, such as example processor 116. Instructions 114 may comprise, for example, a client program 118 and a TCP client module 119, among other suitable programs. Processor 116 of client computing device 110 may be configured to execute client program 118 and TCP client module 119. In at least some implementations, client program 118 may comprise a browser program. A browser program may refer to a web browser, a file browser, or other suitable software application for obtaining, presenting, or managing information accessible via a communication network. In at least some implementations, TCP client module 119 may constitute part of an operating system of client computing device 110. TCP client module 119 may facilitate communication between client program 118 and one or more network nodes such as, for example, server system 120 via communication network 160. As one example, TCP client module 119 may provide TCP connection management, transfer of data, packetizing, etc. on behalf of client program 118. Server system 120 may include any suitable number or arrangement of server computing devices. For example, FIG. 1 depicts server system 120 including a plurality of server computing devices 122, 124, and 126. Server computing devices 124 and 126 may be merely duplicative of example server computing device 122 in at least some implementations. Collectively, server computing devices 122, 124, and 126 may constitute ea server farm.

Server computing device 122 may comprise storage media 130 having or including instructions 132 stored thereon. Instructions 132 may be executable by one or more processors, such as example processor 134. Instructions 132 may include, for example, a server program 136 and a TCP server module 137, among other suitable programs. Processor 134 of server computing device 122 may be configured to execute server program 136 and TCP server module 137. TCP server module 137 may facilitate communication between server program 136 and one or more network nodes such as, for example, client computing device 110 via communication network 160. As one example, TCP server module 137 may provide TCP connection management, transfer of data, packetizing, etc. on behalf of server program 136.

Storage media 130 may further have or include a database system 138 stored thereon. Database system 138 may include information grouped as one or more discrete objects that may be individually requested by a client computing device. For example, database system 138 is depicted as including example object 140. An object may refer to a grouping of information comprising one or more units of information (e.g., bytes). An object may refer to any suitable web resource, such as, for example, a webpage markup file (e.g., a .html file), a web style sheet file (e.g., a .css file), an image file (e.g., a .jpeg file), a video file (e.g., a .mpeg file), an audio file (e.g., mp3 file), a javascript file (e.g., a .js file), etc. An object may be expressed in terms of size as a number of bytes of information. Object 140 may comprise a static object or a dynamic object.

Server program 136 and/or TCP server module 137 collectively may support any suitable number of network sockets or ports each capable of supporting respective TCP connections. As one example, communication interface 142 is depicted as including a first network socket 144 supporting a first TCP connection 150, a second network socket 146 supporting a second TCP connection 152, and a third network socket 148 supporting a third TCP connection 154.

TCP connections 150, 152, and 154 may be referred to as parallel TCP connections when such connections enable a web resource or object to be communicated between network nodes, such as client computing device 110 and server computing device 122, for example. In such implementations, a client computing device may request and receive an object from a server computing device over a plurality of parallel TCP connections. While FIG. 1 depicts three parallel TCP connections, any suitable number of parallel TCP connections may be opened between two network nodes for obtaining an object. For example, client computing device 110 may open two, three, four or more, ten or more, one hundred or more, one thousand or more, etc. parallel TCP connections between client computing device 110 and server computing device 122 via respective network sockets of server computing device 122.

As one example, client program 118, upon execution by a processor such as processor 116, is configured to open a plurality of parallel TCP connections between client computing device 110 and server computing device 122. In at least some implementations, TCP client module 119 conforms to the TCP specification as currently defined by the World Wide Web Consortium (W3C). For example, TCP client module 119 may open any suitable number of parallel TCP connections between client computing device 110 and another network node (e.g., server computing platform 122) to obtain an object in response to receiving respective commands from client program 118 to open the specified number of parallel TCP connections. However, in at least some implementations, TCP client module 119 may instead open any suitable number of parallel TCP connections between client computing device 110 and another network node for an object on behalf of client program 118 in response to receiving an indication from client program 118 to open a single TCP connection to the object. For example, client program 118 may send a command to TCP client module 119 to obtain an object from a network node, whereby TCP client module 119 may select and open a number of parallel TCP connections in response to receiving the command from client program 118.

Client program 118 is further configured to send each of a plurality of application level web resource requests for respective byte ranges of an object from client program 118 executed on the client computing device to server program 136 executed on the server computing device over a corresponding one of the plurality of parallel TCP connections. Client program 118 may send application level web resource requests via TCP client module 119 in at least some implementations. It will be appreciated that the web resource requests may be made according to a suitable application level transfer protocol, such as hypertext transfer protocol (HTTP), SPDY protocol, etc. Application level transfer protocols are defined in the Open Standards Interconnection (OSI) model and Internet Protocol Suite models, which are well known in the art. Web resource requests made according to the HTTP protocol are referred to as HTTP requests, and are referred to herein and in the Figures for illustrative purposes.

Server program 136 is further configured to receive each of the plurality of application level web resource requests for the respective byte ranges of the object over the corresponding one of the plurality of parallel TCP connections. Server program 136 may receive application level HTTP requests via TCP server module 137 in at least some implementations. Server program 136 is configured to send the requested byte ranges of the object from the server computing device to the client computing device over the plurality of parallel TCP connections. Server program 136 may send byte ranges of an object via TCP server module 137 in at least some implementations. Client program 118 is configured to receive the byte ranges of the object from the server computing device over the respective parallel TCP connections. Client program 118 may receive byte ranges of an object via TCP client module 119 in at least some implementations. Client program 118 may be further configured to assemble the object at the client computing device by combining the byte ranges of the object received over the plurality of parallel TCP connections. Information transferred between a server computing device and a client computing device over parallel TCP connections may be encrypted in some scenarios. Encrypted information that is received at a client computing device may be decrypted before it is used by the client computing device.

In at least some implementations, client program 118 is configured to open an additional parallel TCP connection based, at least in part, on a connection state of one or more opened parallel TCP connections. A connection state may include one or more parameters, including a data transfer rate (DTR), a round trip time (RTT) for responses received at a client computing device in response to HTTP requests, a segment size such as a maximum segment size (MSS) for each parallel TCP connection, a slow start threshold (SSThresh) for one or more parallel TCP connections, a congestion window size (CWND) of one or more parallel TCP connections, or an estimated bandwidth for one or more parallel TCP connections. The connection state may include some or all of these parameters.

DTR refers to the bandwidth, connection speed, or rate at which information is transferred between two network nodes over a communication network. RTT refers to an amount of time that elapses between a time when a signal is sent to a network node and a time when an acknowledgment is received from the network node indicating that the signal was received. MSS refers to the largest amount of data, specified in bytes, that a network node can process in a single, unfragmented unit. SSThresh refers to a limit imposed by TCP on an amount of information that may be sent over an individual TCP connection expressed as a number of segments. CWND refers to a self imposed restriction by a sender of information.

In at least some implementations, server system 120 may include a network appliance 128. Network appliance 128 may comprise a server computing device as previously described with respect to example server computing device 122. Accordingly, network appliance 128 may comprise a processor and storage media having or including instructions stored thereon that may be executed by the processor. Such instructions may include a server program such as previously described server program 136 and a TCP server module such as previously described TCP server module 137, among other suitable programs. Such instructions may further be configured to enable network appliance 128 to provide one or more of the following functions: load balancing, caching, connection management, SSL termination, TCP rules engine implementation, security (e.g., providing a firewall), disaster recovery, or auto remote backup, among other suitable network appliance functions.

As one example, network appliance 128 may function as a load balancer by proxying requests received from a client computing device, such as client computing device 110. Network appliance 128 may retrieve requested objects from one or more of a plurality of back end servers in a server farm before serving those objects to the requesting client computing device. In FIG. 1, server computing devices 122, 124, and 126 may comprise back end servers in relation to network appliance 128. In at least some implementations, an object that is obtained by network appliance 128 in response to receiving a request for the object from a client computing device may buffer the object in a storage media (e.g., memory) before sending the object to the requesting client computing device. In at least some implementations, network appliance 128 may break up individual HTTP requests received from a client computing device across a plurality of back-end servers so that large objects or large byte ranges of objects are served in parallel from multiple back-end servers to network appliance 128 before they are forwarded to the client computing device over parallel TCP connections.

Figure 2:
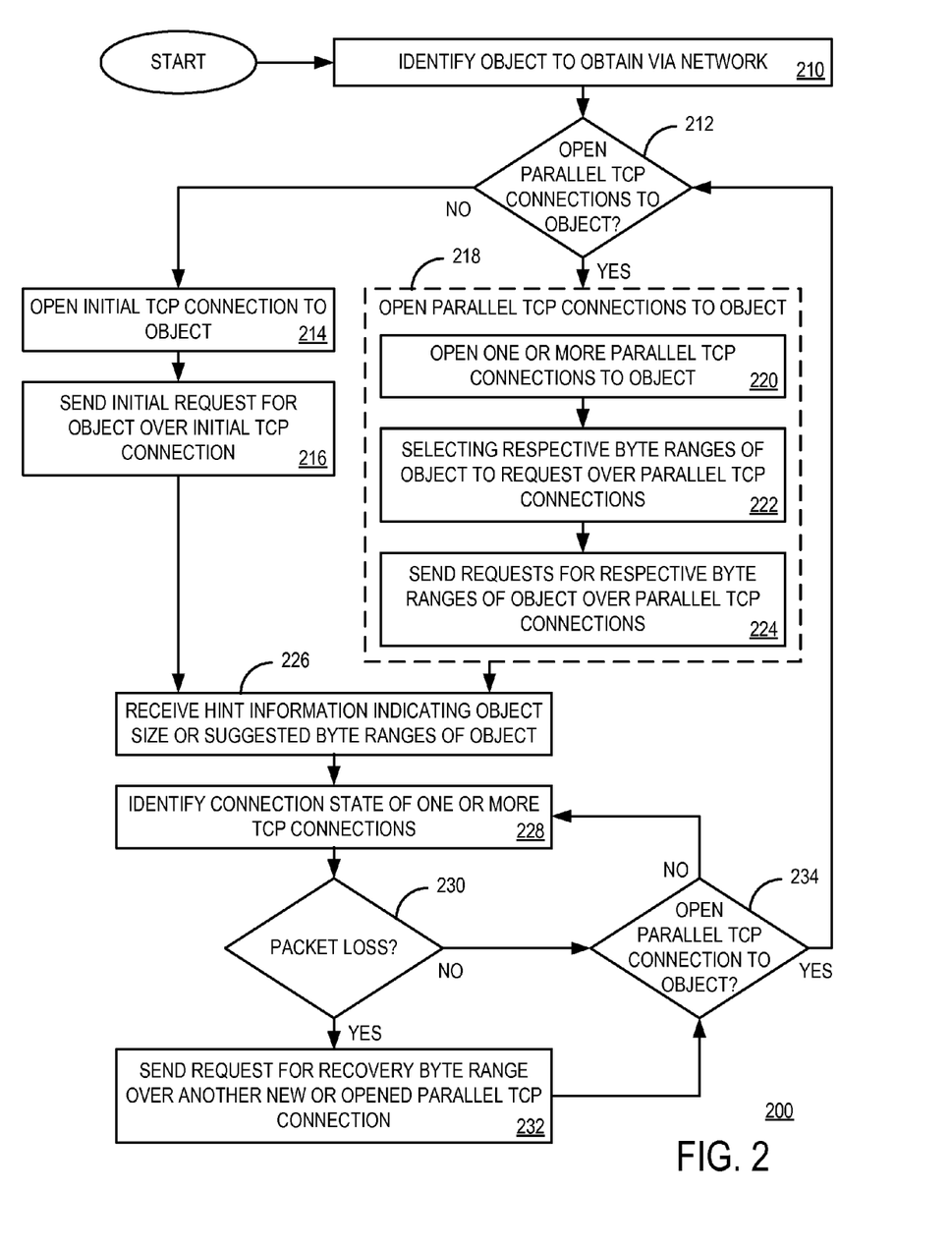
FIG. 2 is a process flow diagram depicting an example computer networking method according to at least one implementation.

FIG. 2 is a process flow diagram depicting an example computer networking method 200 according to at least one implementation. As one example, method 200 describes a method for HTTP communication over a wide area network between a client computing device and a server computing device. Method 200 may be performed at or by a client computing device, such as previously client computing device 110, for example.

Operation 210 may comprise identifying an object to obtain via a communication network. As previously described, an object may refer to any suitable web resource. An object identified at operation 210 may comprise a static object or a dynamic object. A server computing device may at least partially buffer a dynamic object in memory prior to sending the dynamic object to a client computing device.

Operation 212 may comprise determining whether to open parallel TCP connections to an object, such as the object identified at operation 210, for example. If parallel TCP connections are not to be opened (at least initially), then the process flow may proceed to operation 214. Operation 214 may comprise opening an initial TCP connection to the object. For example, operation 214 may comprise opening an initial TCP connection between a client program executed on a client computing device, and a server program executed on a server computing device over a computer network.

Operation 216 may comprise sending an initial request for the object over the initial TCP connection. For example, operation 216 may comprise sending an application level HTTP request for an object or a specific byte range of an object from a client program executed on a client computing device to a server program executed on a server computing device over the TCP connection opened at operation 214. The server computing device may process the request and return the requested object or requested byte range of the object to the client computing device over the TCP connection.

If parallel TCP connections are instead to be opened (at least initially) then the process flow may instead proceed to operation 218. Operation 218 may comprise opening parallel TCP connections to the object. For example, operation 220 may comprise opening one or more parallel TCP connections between a client program executed on a client computing device, and a server program executed on a server computing device over a computer network.

Two or more parallel TCP connections may be opened synchronously or asynchronously between a client computing device and a server computing device. For example, a client computing device may asynchronously open a plurality of parallel TCP connections by opening a first TCP connection, and after requesting and receiving some information from a server computing device may open a second TCP connection in parallel with the first TCP connection.

Operation 222 may comprise selecting respective byte ranges of the object to request over the parallel TCP connections opened, for example, at operation 220. Byte ranges of any suitable size may be selected at operation 222. The selection of byte ranges of an object may be based, at least in part, one or more of the following: (1) a connection state of one or more TCP connections opened between the client computing device and the server computing device; (2) hint information received by the client computing device from the server computing device indicating a size of the requested object or suggested byte ranges of the requested object; (3) a number of parallel TCP connections already opened between the client computing device and the server computing device for the requested object; (4) a download progress of the object over one or more TCP connections in terms of the number of bytes of the object detected as received by the client computing device relative to the byte ranges of the object requested by the client computing device; (5) the presence or extent of packet loss among requests or responses for the object over one or more TCP connections between the client computing device and the server computing device; (6) the size of other byte ranges of the object requested by the client computing device; and (7) the start and end byte locations of other byte ranges of the object requested by the client computing device. As one example, selecting or determining a byte range for each HTTP request may be based, at least in part, on an RTT and an MSS for the opened parallel TCP connections. As another example, byte ranges may be selected to shorten the overall elapsed time of downloading the object, considering the already opened connections, their current transfer rate, and observed packet loss over a plurality of parallel TCP connections.

In at least some implementations, a number of byte ranges of an object selected at operation 222 may correspond to a number of parallel TCP connections opened for the object. For example, if three parallel TCP connections are opened for an object at operation 220, then three different byte ranges of the object may be selected at operation 222.

In at least some implementations, two or more byte ranges of an object may be selected to be contiguous with each other across the requested byte ranges of the object. In the case of two parallel TCP connections, for example, operation 222 may comprise selecting a first byte range (e.g., 1-600,000 bytes) of an object to be requested over a first TCP connection and selecting a second byte range (e.g., 600,001-1,200,000 bytes) of the object to be requested over a second TCP connection. In the case of three parallel TCP connections, for example, operation 222 may comprise selecting a first byte range (e.g., 1-300,000 bytes) of an object to be requested over a first TCP connection, selecting a second byte range (e.g., 300,001-600,000 bytes) of the object to be request over a second TCP connection, and selecting a third byte range (e.g., 600,001-1,200,000 bytes) of the object to be requested over a third TCP connection.

In at least some implementations, if two or more parallel TCP connections are opened asynchronously with each other, then the earlier opened TCP connection may be utilized to request a lower byte range (e.g., 1-600,000) of an object and the subsequently opened TCP connection may be utilized to request a higher byte range (e.g., 600,001-1,200,000 bytes) of the object. In this way, subsequently established parallel TCP connections may be utilized to request ascending byte ranges of an object.

In at least some implementations, two or more byte ranges of an object selected at operation 222 may be of different sizes relative to each other. As one example, a size of each byte range selected at operation 222 may increase or decrease with each successive TCP connection opened at operation 220 or with each successive byte range that is selected. For example, a first byte range selected for an earlier opened parallel TCP connection may be larger or smaller than a second byte range selected for a later opened parallel TCP connection.

Operation 224 may comprise sending requests for respective byte ranges of the object over the parallel TCP connections. As one example, operation 224 may comprise sending each of a plurality of application level HTTP requests for respective byte ranges of an object from a client program executed on a client computing device to a server program executed on a server computing device over a corresponding one of a plurality of parallel TCP connections. The byte ranges requested at operation 224 may comprise, for example, the byte ranges selected or determined at operation 222.

A server computing device may process requests received from the client computing device and send requested information (e.g., one or more requested byte ranges of an object) over one or more opened TCP connections, whereby the requested information may be received by the client computing device over the one or more opened TCP connections. For example, requested byte ranges of an object may be received by the client computing device from the server computing device over respective parallel TCP connections.

Operation 226 may comprise receiving hint information. In at least some implementations, a server computing device may send hint information to a requesting client computing device over one or more opened TCP connections. As one example, operation 226 may comprise receiving hint information from a server computing device at a client computing device in HTTP format over one or more of a plurality of parallel TCP connections.

Hint information may indicate a size of an object requested by a client computing device. The size of an object may be expressed as a content-length of the object in bytes, for example. If, for example, the object is a static object, the respective byte ranges of the object may be determined based, at least in part, on a content length header of a reply from the server computing device indicating a file size of the object. If the size of the object is unknown to a server computing device, then the size of the object may be expressed as a number of bytes buffered by the server computing device upon sending the hint information to the client computing device.

As another example, hint information may alternatively or additionally indicate one or more suggested byte ranges of an object to be requested by a client computing device from a server computing device. Such hint information received from a server computing device may enable a client computing device to select or refine byte ranges of an object requested over one or more TCP connections. However, in at least some implementations, hint information may not be sent by a server computing device or received by a client computing device. Accordingly, operation 226 may be omitted in some examples.

Operation 228 may comprise identifying a connection state of one or more TCP connections. As byte ranges of an object are requested and received by the client computing device from the server computing device, the client computing device may monitor the connection state of the one or more opened TCP connections. As previously described, a connection state may include one or more parameters, including DTR, RRT, MSS, SSThresh, CWND, or estimated bandwidth for the one or more opened TCP connections. The connection state identified at operation 228 may include some or all of these parameters.

Operation 230 may comprise determining whether packet loss has occurred over the initial TCP connection or over one or more of the parallel TCP connections. For example, a computer network utilized by a client computing device to communicate with a server computing device may comprise at least a wide area network which exhibits packet loss on a threshold percentage of connections over the wide area network. If packet loss has occurred, the process flow may proceed to operation 232.

Operation 232 may comprise, upon detecting packet loss in one or more opened TCP connections, sending a request for a recovery byte range over another new or previously opened parallel TCP connection. In at least some implementations, a recovery byte range may begin following a most recently received byte from a parallel TCP connection on which packet loss was detected.

Operation 234 may comprise determining whether to open an additional parallel TCP connection to the object. In one example, the decision whether to open an additional TCP connection to the object may be made by a client program such as previously described client program 118. However, in another example, the decision whether to open an additional TCP connection to the object may be made by a TCP client module such as previously described TCP client module 119.

The decision of whether to open another parallel TCP connection between a client computing device and a server computing device for an object may be based, at least in part, on one or more of the following: (1) a connection state of one or more TCP connections already opened between the client computing device and the server computing device; (2) hint information received by the client computing device from the server computing device indicating a size of the requested object or suggested byte ranges of the requested object; (3) a number of parallel TCP connections already opened between the client computing device and the server computing device for the requested object; (4) a download progress of the object over one or more TCP connections in terms of the number of bytes of the object detected as received by the client computing device relative to the byte ranges of the object requested by the client computing device; and (5) the presence or extent of packet loss among requests or responses for the object over one or more TCP connections between the client computing device and the server computing device.

If a request for a recovery byte range is to be sent over a new parallel TCP connection, then a new parallel TCP connection may be opened by proceeding to operation 218. For example, a new parallel TCP connection may be opened at operation 220, a byte range for the new parallel TCP connection may be selected at operation 222 to correspond to the recovery byte range, and a request for the selected byte range may be sent at operation 224 over the new parallel TCP connection. The recovery byte range may be received by the client computing device from the server computing device over the new parallel TCP connection.

If a request for a recovery byte range is to be sent over another parallel TCP connection that was previously opened, then the request for a recovery byte rate may be sent over the another parallel TCP connection at operation 232. Accordingly, the process flow may proceed instead to operation 228 where the connection state for the opened parallel TCP connections may continue to be monitored.

If packet loss has not occurred, the process flow may proceed to operation 234. In at least some implementations, determining whether to open an additional parallel TCP connection may include determining whether a blended DTR of two or more opened parallel TCP connections exceeds a threshold DTR. A DTR may be based, at least in part, on an amount of information received over time at a client computing device in response to one or more web resource requests. In at least some implementations, a blended DTR may be computed by finding or obtaining an average, median, or aggregate DTR for each of two or more opened TCP connections. Accordingly, operation 234 in combination with operation 218 may comprise opening an additional parallel TCP connection if a blended DTR exceeds a threshold data transfer rate.

In at least some implementations, a connection state may include an RTT for responses received at a client computing device in response to one or more web resource requests. Determining whether to open an additional parallel TCP connection may include, if an RTT is greater than a predetermined threshold, then determining to open an additional parallel TCP connection. Accordingly, operation 234 in combination with operation 218 may comprise opening an additional parallel TCP connection if an RTT is greater than a predetermined threshold.

In at least some implementations, a connection state may include an MSS for each parallel TCP connection. Determining whether to open an additional parallel TCP connection may include, if an MSS is smaller than a predetermined threshold, then determining to open an additional parallel TCP connection. Accordingly, operation 234 in combination with operation 218 may comprise opening an additional parallel TCP connection if an MSS is smaller than a predetermined threshold.

In at least some implementations, a connection state may include an SSThresh for one or more parallel TCP connections. Determining whether to open an additional parallel TCP connection may include, if an SSThresh is remaining constant or is increasing over time, then determining to open an additional parallel TCP connection. Accordingly, operation 234 in combination with operation 218 may comprise opening an additional parallel TCP connection if a slow start threshold is remaining constant or is increasing over time.

In at least some implementations, a connection state may include an estimated bandwidth for one or more parallel TCP connections. Determining whether to open an additional parallel TCP connection may include, if a measured DTR approaches within a predetermined threshold from an estimated bandwidth, then determining to open an additional parallel TCP connection. Accordingly, operation 234 in combination with operation 218 may comprise opening an additional parallel TCP connection if a measured DTR approaches within a predetermined threshold from an estimated bandwidth.

If one or more additional parallel TCP connections are to be opened at operation 220, respective byte ranges selected at operation 222 may be based, at least in part, on the hint information obtained at operation 226. Respective byte ranges selected at operation 222 may be additionally or alternatively based, at least in part, on the connection state identified at operation 228. For example, operation 226 may comprise computing and selecting an optimum number of parallel TCP connections for a given RTT of the one or more opened TCP connections, remaining number of bytes of the object to be downloaded from the server computing device, and the packet loss identified, for example, at operation 230.

In at least some implementations, it may be determined at operation 234 that additional parallel TCP connections should not be opened if more than two TCP connections are in a slow-start phase and more than two of the parallel TCP connections are exhibiting a ssthresh that is less than half of a default value. In at least some implementations, it may be determined at operation 234 that additional parallel TCP connections should not be opened if the total DTR of all parallel TCP connections for an object (e.g., in bytes per sec) currently being downloaded is stable or increasing.

In at least some implementations, operation 234 may be used to determine an optimum number of parallel TCP connections to obtain a given object over a computer network. As one example, a number of parallel TCP connections may be optimized for a given connection state so that all bytes of a given object are received at a client computing device in the shortest amount of time. For example, if the RTT is known between the client computing device and the server computing device, then the amount of time to open a new connection may be estimated. If the connection state of an opened and active TCP connection is known, and the number of packets per round trip over the TCP connection is known, then a growth rate of the DTR of the TCP connection may be estimated.

As one example, determining whether to open a new parallel TCP connection may comprise determining to open a new parallel TCP connection if the following example equation is satisfied:

(estimated time to open a new parallel TCP connection)+(estimated number of bytes of object remaining to be downloaded at estimated time to open the new parallel TCP connection/estimated DTR growth rate of new parallel TCP connection)<(current number of bytes of object remaining to be downloaded/estimated overall DTR growth rate of all parallel TCP connections to the object).

In at least some implementations, an optimum number of parallel TCP may be determined in accordance with limitations imposed by either the client computing device or the server computing device. As one example, the client computing device or the server computing device may limit a number of parallel TCP connections that may be used to obtain an object. The number of parallel TCP connections used to request and receive respective byte ranges of an object may be limited to any suitable number of connections, including two, three, four, ten, or one hundred parallel TCP connections, for example.

Figure 3:
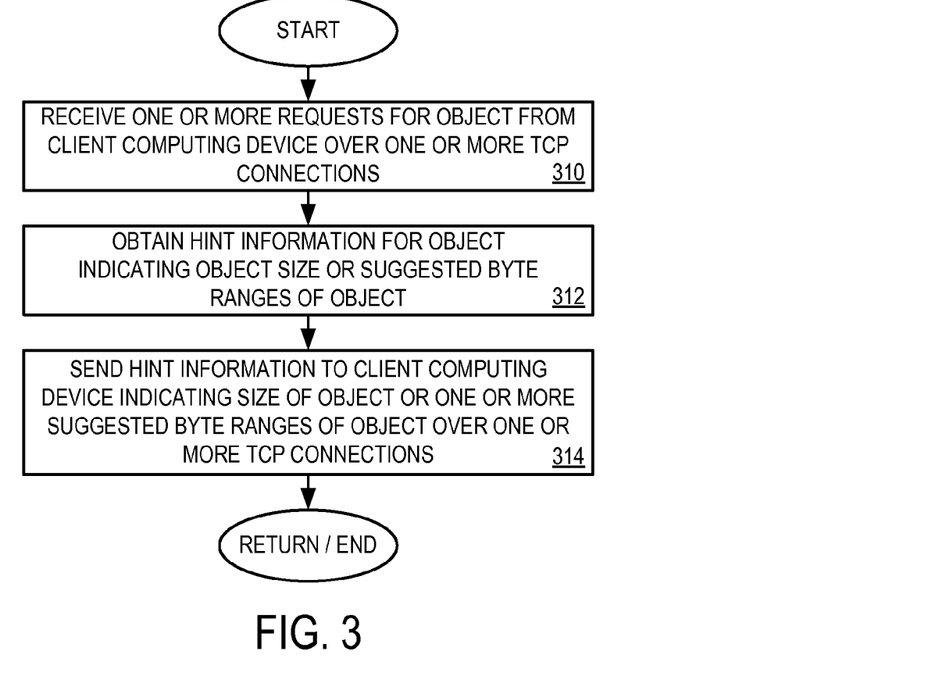
FIG. 3 is a process flow diagram depicting another example computer networking method according to at least one implementation.

FIG. 3 is a process flow diagram depicting another example computing networking method according to at least one implementation. As one example, method 300 describes a process for providing hint information over a wide area network from a server computing device to a client computing device. As previously described in the context of method 200 of FIG. 2, such hint information may be used by a client computing device to select one or more byte ranges of an object to be requested from a server computing device. Accordingly, method 300 may be performed at or by a server computing device, such as previously described server computing device 122, for example.

Operation 310 may comprise receiving one or more requests for an object from a client computing device over an individual TCP connection or over one or more of a plurality of parallel TCP connections. Operation 312 may comprise obtaining hint information for the object requested by the client computing device. Hint information, as previously described, may indicate the object or suggested byte ranges of the object. The size of an object may be expressed as a content-length of the object in bytes, for example.

In at least some implementations, if the server computing device is unable to obtain the size of the object, then the computing server device may obtain a number of bytes of the object that have been buffered in a memory of the server computing device. For a dynamic object, for example, a suggested byte range of the hint information may be based, at least in part, on a number of bytes of the dynamic object that are detected as buffered in the server computing device upon sending the hint information to the client computing device.

In at least some implementations, suggested byte ranges of the object may be obtained by the server computing device based, at least in part, on one or more parameters, including a size of the requested object, a connection state of one or more TCP connections opened between the server computing device and the client computing device, a number of TCP connections opened between the server computing device and the client computing device, or a server load experienced by the server computing device in relation to a number of client computing devices served by the server computing device.

In at least some implementations, hint information obtained at operation 312 may indicate a number of different byte ranges that correspond to a number of parallel TCP connections opened between a client computing device and a server computing device for requesting an object. As one example, if three parallel TCP connections are opened between a client computing device and a server computing device to request an object, the hint information may indicate three different byte ranges of the object. For example, hint information for a 1,200 byte object requested over three parallel TCP connections may indicate byte ranges 1-400 bytes, 401-800 bytes, and 801-1200 bytes.

Operation 314 may comprise sending hint information obtained at operation 312 to the client computing device over one or more TCP connections. As one example, hint information may be sent by the server computing device to the client computing device over a single TCP connection. As another example, hint information may be sent by the server computing device to the client computing device over a plurality of parallel TCP connections. For example, hint information indicating a first byte range of an object may be sent over a first TCP connection and a second byte range of the object may be sent over a second TCP connection. In at least some implementations, hint information may be indicated by a content length header of a reply from a server computing device to a client computing device indicating a file size of the object or indicating one or more suggested byte ranges of the object.

Figure 4:
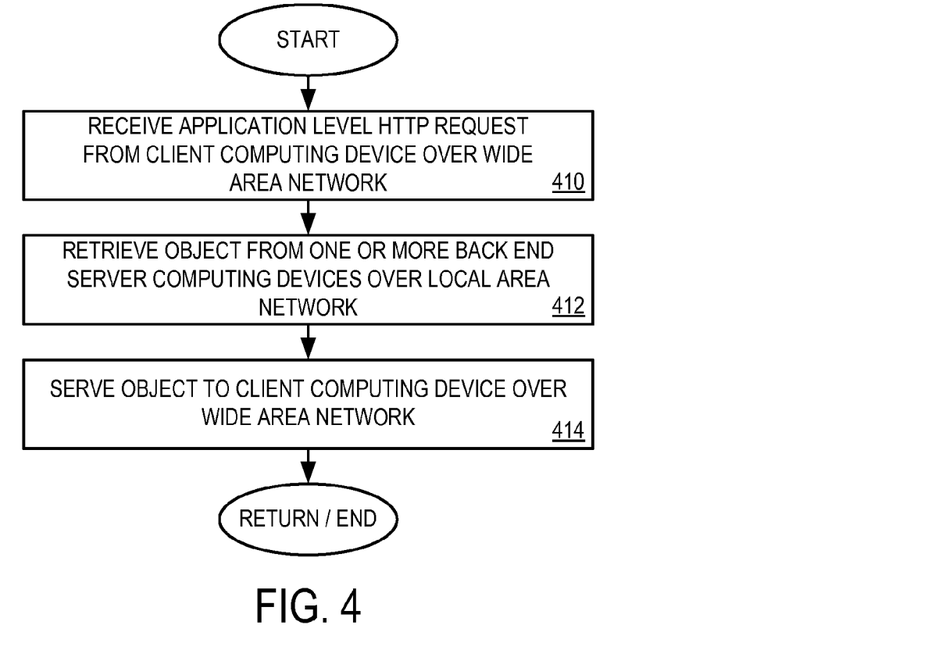
FIG. 4 is a process flow diagram depicting yet another example computer networking method according to at least one implementation.

FIG. 4 is a process flow diagram depicting yet another example computing networking method 400 according to at least one implementation. As one example, method 400 describes a process whereby a server computing device functions as a load balancer. In at least one implementation, the server computing device may proxy requests from a client computing device and retrieve requested objects from one of a plurality of back end servers in a server farm, before serving those objects to the requesting client computing device. Accordingly, method 400 may be performed at or by a server computing device, such as previously described network appliance 128, for example.

Operation 410 comprises receiving an application level web resource request for an object or a byte range of an object from a client computing device over a wide area network. For example, one or more application level web resource requests for an object or a number of byte ranges of an object may be received from a client computing device over a plurality of parallel TCP connections. Operation 412 comprises retrieving the requested object from one or more back end server computing devices over a local area network. Operation 414 comprises serving the object to the client computing device over the wide area network. For example, one or more byte ranges of the object may be sent to the client computing device over a plurality of parallel TCP connections.

Figure 5:
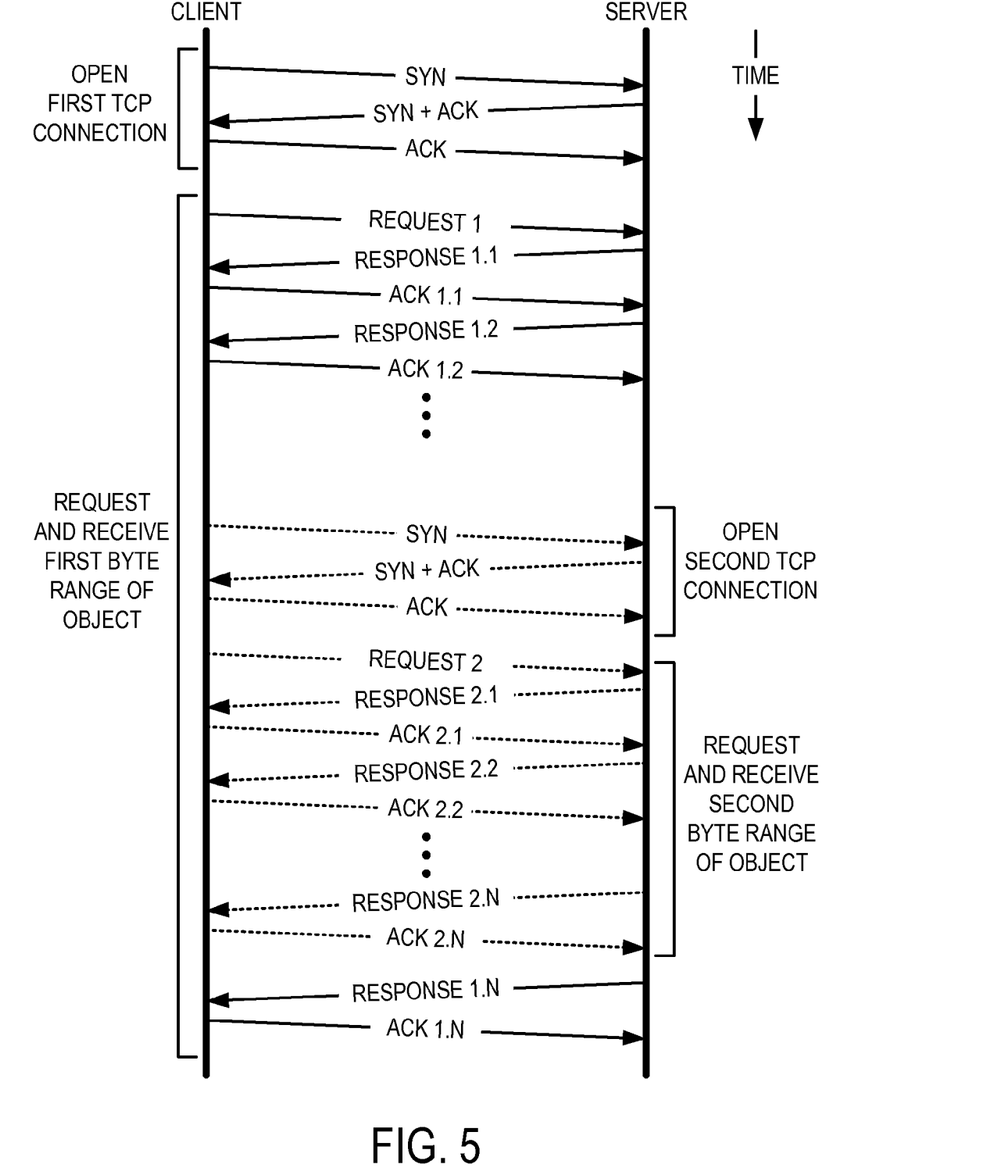
FIG. 5 is a timeline diagram depicting example information flow according to at least one implementation.

FIG. 5 is a timeline diagram depicting example information flow according to at least one implementation. As one example, FIG. 5 depicts information flow according to an implementation of method 200 of FIG. 2, whereby an individual TCP connection is opened at operation 214 followed by a subsequent opening of a parallel TCP connection. In FIG. 5, time flows from the top of the diagram to the bottom of the diagram as indicated by the time arrow.

In accordance with TCP protocol, a first TCP connection may be opened between a client computing device and a server computing device by what may be referred to as a three-way handshake. For example, the client computing device sends a synchronize information element (SYN) to the server computing device over a communication network. The server computing device receives the SYN from the client computing device. In response to receiving the SYN from client computing device, the server computing device sends a SYN and an acknowledgement information element (ACK) to the client computing device over the communication network. In response to receiving the SYN and the ACK from the server computing device, the client computing device sends an ACK to the server computing device over the communication network. The server computing device receives the ACK from the client computing device over the communication network. At this point, both the client computing device and the server computing device have received an acknowledgment of the first TCP connection, and the first TCP connection is considered opened.

Once the first TCP connection is opened, the client computing device may send a first request (REQUEST 1) to the server computing device over the first TCP connection for a first byte range of an object. For TCP connections that have already been used to request and obtain an object or a byte range of an object, the previously described three-way handshake need not be repeated in order to request and obtain another object or another byte range of an object. The server computing device may respond to the first request by sending a response (RESPONSE 1.1) that contains at least some bytes of the requested first byte range. An ACK (ACK 1.1) may be returned by the client computing device to the server computing device in response to receiving RESPONSE 1.1.

A second response (RESPONSE 1.2) may be sent by the server computing device that contains additional bytes of the requested first byte range. An ACK (ACK 1.2) may be again returned by the client computing device to the server computing device in response to receiving RESPONSE 1.2. This process may be repeated through RESPONSE 1.N when all bytes of the first requested byte range have been obtained over the first TCP connection.

As bytes of the first byte range are being obtained over the first TCP connection, an additional parallel TCP connection may be opened. The process described above for the first TCP connection may be similarly performed to open a second TCP connection for the object via the previously described three-way handshake, for example. The second TCP connection may be used to obtain a second byte range of the object in parallel with the first TCP connection used to obtain the first byte range of the object. FIG. 5 shows an example scenario where the second byte range is completely received over the second parallel TCP connection as indicated by RESPONSE 2.N and corresponding ACK 2.N before the first byte range is completely received over the first parallel TCP connection as indicated by RESPONSE 1.N and corresponding ACK 1.N.

Figure 6:
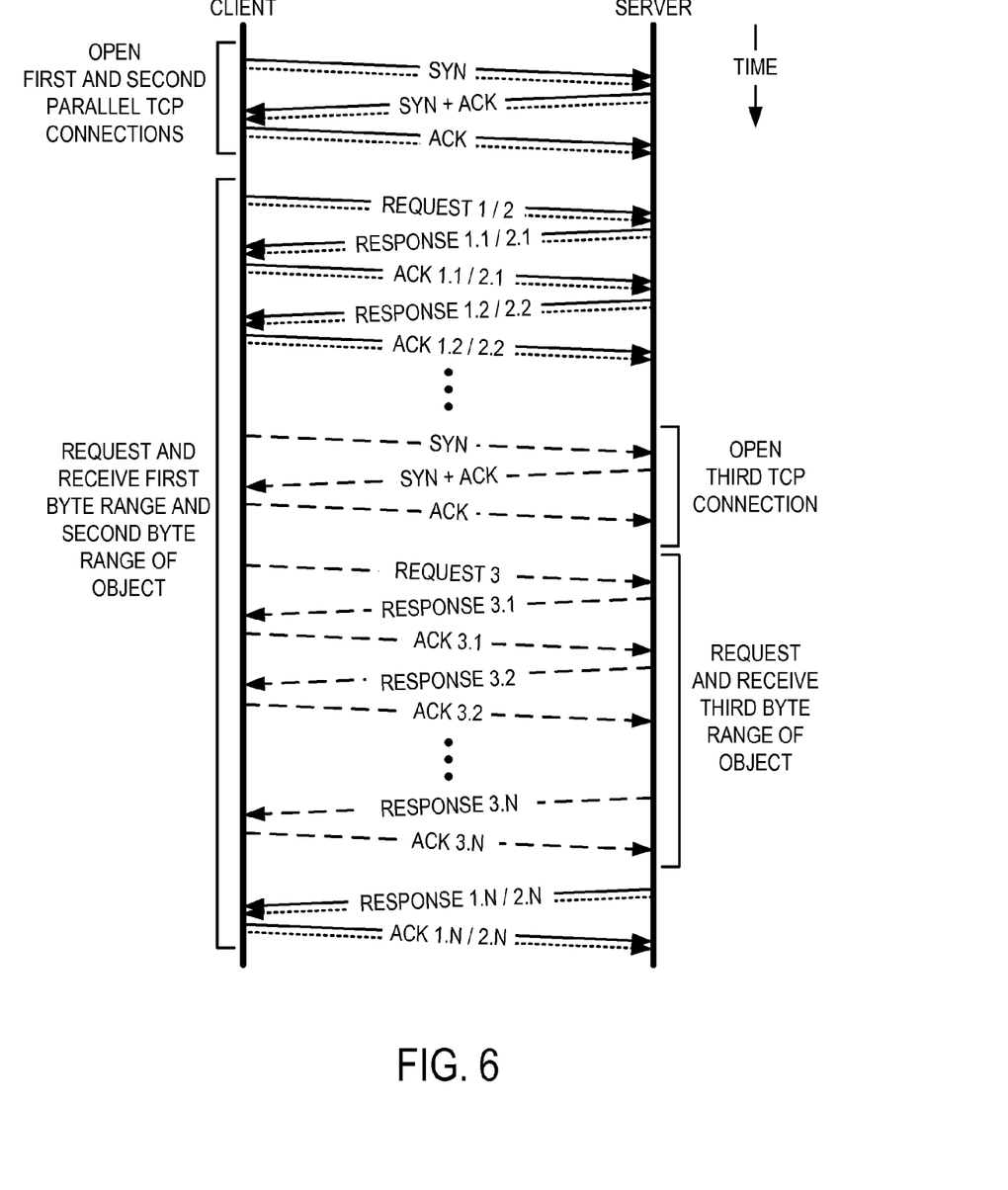
FIG. 6 is another timeline diagram depicting example information flow according to at least one implementation.

FIG. 6 is another timeline diagram depicting example information flow according to at least one implementation. As one example, FIG. 6 depicts information flow according to another implementation of method 200 of FIG. 2, whereby two or more parallel TCP connections are initially opened at operation 218 followed by a subsequent opening of a third parallel TCP connection. In FIG. 6, time again flows from the top of the diagram to the bottom of the diagram as indicated by the time arrow.

FIG. 6 similarly depicts the three-way handshake by use of SYN and ACK to open first and second parallel TCP connections between a client computing device and a server computing device over a communication network. Once the first and second parallel TCP connections are opened, the client computing device may send a first request (REQUEST 1 and a second request (REQUEST 2) to the server computing device over each of the first and second parallel TCP connections for respective first and second byte ranges of an object. The server computing device may respond by sending responses (RESPONSE 1.1 and RESPONSE 2.1) that contain at least some bytes of the respective first and second byte ranges. Acknowledgement of the receipt of these responses may be returned by the client computing device as respective ACKs (ACK 1.1 and ACK 2.1). This process may be repeated until all bytes of the first and second requested byte ranges have been obtained over the first and second parallel TCP connections as indicated by respective (RESPONSE 1.N and RESPONSE 2.N).

As bytes of the first and second byte ranges are being obtained over the first and second parallel TCP connections, an additional third parallel TCP connection may be opened. The three-way handshake described above for the first and second TCP connections may be similarly performed to open a third parallel TCP connection for the object. The third TCP connection may be used to obtain a third byte range of the object in parallel with the first and second TCP connections used to obtain the first and second byte ranges of the object. For example, a third request (REQUEST 3) may be sent by the client computing device and one or more responses (RESPONSE 3.1-RESPONSE 3.N) may be returned by the server computing device until the third byte range of the object is obtained by the client computing device.

The herein described storage media may comprise primary, secondary, and/or tertiary storage media. Primary storage media may include memory such as random access memory and/or read-only memory, for example. Secondary storage media may include mass storage such as a magnetic or solid state hard drive. Tertiary storage media may include removable storage media such as a magnetic or optical disk, a magnetic tape, or a solid state storage device, for example. The storage media or portions thereof may be operatively receptive of, or otherwise configurable to couple to, other components of a computing device, such as a processor, for example.

The invention claimed is:

1. A computer networking method, comprising:
    at a client computing device, opening an initial TCP connection between a client program executed on the client computing device, and a server program executed on a server computing device over a computer network;
    sending an initial application level HTTP request for an object over the initial TCP connection from the client computing device to the server computing device over the computer network;
    receiving, at the client computing device from the server computing device, hint information indicating a size of the object and suggested byte ranges in response to the initial HTTP request;
    identifying, at the client computing device, a connection state of the initial TCP connection that is opened and active, the connection state including at least a round trip time for responses received by the client computing device over the initial TCP connection;
    determining, at the client computing device, to open one or more additional parallel TCP connections in parallel with the initial TCP connection that is opened and active if the round trip time of the connection state of the initial TCP connection is greater than a predetermined threshold;
    sending each of a plurality of application level HTTP requests for respective byte ranges of the object from the client program executed on the client computing device to the server program executed on the server computing device over corresponding parallel TCP connections including the initial TCP connection and the one or more additional parallel TCP connections, the byte ranges being calculated from the size of the object and the suggested byte ranges indicated by the hint information.

2. The method of claim 1, wherein the data transfer rate is based, at least in part, on an amount of information received over time at the client computing device in response to the plurality of application level HTTP requests.

3. The method of claim 1, further comprising:
wherein determining to open an additional parallel TCP connection includes determining whether a blended data transfer rate of two or more opened parallel TCP connections exceeds a threshold data transfer rate; and
opening the additional parallel TCP connection if the blended data transfer rate exceeds the threshold data transfer rate.

4. The method of claim 1, wherein determining to open an additional parallel TCP connection further includes, if the maximum segment size of the connection state of the initial TCP connection is smaller than a predetermined threshold, then determining to open an additional parallel TCP connection.

5. The method of claim 1, wherein determining to open an additional parallel TCP connection further includes, if the slow start threshold of the connection state of the initial TCP connection is remaining constant or is increasing over time, then determining to open an additional parallel TCP connection.

6. The method of claim 1, wherein determining to open one or more additional parallel TCP connections is further based upon a slow start threshold for the one or more additional parallel TCP connections or an estimated bandwidth for the one or more additional TCP connections.

7. The method of claim 6, wherein the number of the one or more additional parallel TCP connections determined to be opened is based, at least in part, on the connection state of the initial TCP connection and further based upon a slow start threshold for the one or more additional parallel TCP connections or an estimated bandwidth for the one or more additional TCP connections.

8. The method of claim 1, further comprising determining the byte range for each HTTP request based, at least in part, on the round trip time and a maximum segment size for the opened parallel TCP connections.

9. The method of claim 1, further comprising:
upon detecting packet loss in one or more opened parallel TCP connections, sending a request for a recovery byte range over another new or opened parallel TCP connection, the recovery byte range beginning following the most recently received byte from the parallel TCP connection on which packet loss was detected.

10. The method of claim 1, wherein the object is a static object and the respective byte ranges are determined based, at least in part, on a content length header of a reply from the server computing device indicating a file size of the object.

11. The method of claim 1, further comprising:
wherein the object includes a dynamic object, and the server computing device at least partially buffers the dynamic object in memory prior to sending the dynamic object to the client computing device; and
wherein the suggested byte range is based, at least in part, upon a number of bytes of the dynamic object that are detected as buffered in the server computing device.

12. The method of claim 1, wherein the server computing device functions as a load balancer by proxying requests from the client computing device and retrieving the requested objects from one of a plurality of back end servers in a server farm before serving those objects to the client computing device.

13. The method of claim 1, wherein the computer network comprises at least a wide area network which exhibits packet loss on a threshold percentage of connections over the wide area network.

14. A client computing device, comprising:
storage device holding executable instructions including a browser program;
a processor configured to execute the browser program, the browser program configured to:
open an initial TCP connection between the browser program executed on the client computing device, and a server program executed on a server computing device over a computer network;
send an initial application level HTTP request for an object over the initial TCP connection from the client computing device to the server computing device over the computer network;
receive, at the client computing device from the server computing device, hint information indicating a size of the object and suggested byte ranges in response to the initial HTTP request;
identify, at the client computing device, a connection state of the initial TCP connection that is opened and active, the connection state including at least a round trip time for responses received by the client computing device over the initial TCP connection;
determine, at the client computing device, to open one or more additional parallel TCP connections in parallel with the initial TCP connection that is opened and active if the round trip time of the connection state of the initial TCP connection is greater than a predetermined threshold, in which a number of the one or more additional parallel TCP connections is based, at least in part, on the connection state of the initial TCP connection and further based upon a slow start threshold for the one or more additional parallel TCP connections or an estimated bandwidth for the one or more additional TCP connections;
send each of a plurality of application level HTTP requests for respective byte ranges of the object from the browser program executed on the client computing device to the server program executed on the server computing device over corresponding parallel TCP connections including the initial TCP connection and the one or more additional parallel TCP connections, the byte ranges being calculated from the size of the object and the suggested byte ranges indicated by the hint information.

15. The device of claim 14, wherein the server computing device functions as a load balancer by proxying requests from the client computing device and retrieving the requested objects from one of a plurality of back end servers in a server farm before serving those objects to the client computing device.

* * * * *